United States Patent [19]

Cavezzan

[11] Patent Number: 4,699,813
[45] Date of Patent: Oct. 13, 1987

[54] PLATINUM/ALKENYLCYCLOHEXENE COMPLEXES USEFUL FOR HYDROSILYLATION CATALYSIS

[75] Inventor: Jacques Cavezzan, Villeurbanne, France

[73] Assignee: Rhone-Poulenc Specialites Chimiques, Courbevoie, France

[21] Appl. No.: 811,350

[22] Filed: Dec. 20, 1985

[30] Foreign Application Priority Data

Dec. 20, 1984 [FR] France .................. 84 19509

[51] Int. Cl.⁴ ............................. B05D 3/02
[52] U.S. Cl. .................. 427/387; 428/447; 528/15; 528/31; 528/32; 525/478; 524/861; 524/862
[58] Field of Search .............. 528/15, 31, 32; 427/387; 525/478; 524/861, 862; 428/447

[56] References Cited

U.S. PATENT DOCUMENTS

| | | | |
|---|---|---|---|
| 3,159,601 | 12/1964 | Ashby | 260/46.5 |
| 3,814,730 | 6/1974 | Karstedt | 260/46.5 |
| 4,025,485 | 5/1977 | Kodama et al. | 528/15 |
| 4,057,596 | 11/1977 | Takamizawa | 528/15 |
| 4,394,317 | 7/1983 | McAfee et al. | 260/49 |
| 4,450,283 | 5/1984 | McAfee et al. | 556/479 |
| 4,477,641 | 10/1984 | Matsumoto | 528/15 |
| 4,500,584 | 2/1985 | Modic | 528/15 |

FOREIGN PATENT DOCUMENTS

| | | |
|---|---|---|
| 0029723 | 6/1981 | European Pat. Off. . |
| 0057459 | 8/1982 | European Pat. Off. . |
| 2016946 | 5/1970 | France . |
| 2172340 | 9/1973 | France . |
| 2255103 | 7/1975 | France . |

*Primary Examiner*—Melvin I. Marquis
*Attorney, Agent, or Firm*—Burns, Doane, Swecker & Mathis

[57] ABSTRACT

Novel platinum/olefin complexes, useful for the hydrosilylation curing catalysis of hardenable organopolysiloxane compositions, are facilely prepared by reacting a platinum halide with at least one alkali or alkaline earth metal carbonate or bicarbonate in the presence of an alkenylcyclohexene ligand having the general formula:

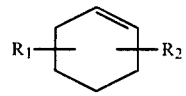

(I)

wherein $R_1$ is an alkenyl radical having from 2 to 6 carbon atoms, and $R_2$ is a hydrogen atom or an inert organic radical, and said complex having a ratio, in gram-atoms of halogen to gram-atoms of platinum, ranging from virtually 0 to 4.

11 Claims, No Drawings

PLATINUM/ALKENYLCYCLOHEXENE COMPLEXES USEFUL FOR HYDROSILYLATION CATALYSIS

CROSS-REFERENCE TO RELATED APPLICATION

My copending application, Serial No. 811,393 filed concurrently herewith and assigned to the assignee hereof.

BACKGROUND OF THE INVENTION

1. Field of the Invention

The present invention relates to novel platinum/olefin complexes, and, more especially, to platinum/alkenylcyclohexene complexes useful as hydrosilylation catalysts, to the preparation thereof and to organopolysiloxane compositions comprising such catalytic complexes.

2. Description of the Prior Art

Numerous platinum compounds and complexes have to date been proposed to this art for promoting the addition reaction of an organohydropolysiloxane containing $\equiv$SiH groups to a diorganopolysiloxane containing hydrocarbon radicals which are alkylenically unsaturated, to form an addition product comprising an added silicon-carbon bond.

This addition reaction can be expressed schematically as follows:

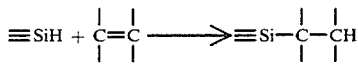

One of the first such catalysts was chloroplatinic acid, as described in U.S. Pat. No. 2,823,218, or platinum metal arranged on a finely divided carrier, as described in U.S. Pat. No. 2,970,150.

In U.S. Pat. Nos. 3,159,601 and 3,159,602, platinum/olefin complexes were proposed with a view to reducing the disadvantages inherent in the use of finely divided platinum or of chloroplatinic acid, said disadvantages relating to the poisoning of the catalyst and to its excessively low reactivity. In U.S. Pat. No. 3,220,972, the reaction products of platinum derivatives with alcohols, aldehydes and ethers were also proposed as a catalyst for the same purpose.

More recently, complexes of platinum and vinylsiloxane, which have been treated with a base and in which the ratio of halogen to platinum is between 0, or a decimal number close to 0, and approximately 1, have been proposed. See U.S. Pat. Nos. 3,715,334, 3,775,432 and 3,814,730.

European Pat. No. 57,459 describes platinum/styrene complexes which have been treated with a base and in which the ratio of halogen to platinum (calculated in gram-atoms of platinum and of halogen) is greater than 1, but less than 4.

The platinum complexes described above have admittedly enabled advances in the state of the art, but they have at least one of the following disadvantages:

(1) they are unstable and display low catalytic activity after a relatively short storage time, on the order of 1 month or less;

(2) they display insufficient activity at low concentrations; and (3) they, especially those described in said '459 European patent, are particularly difficult to produce in a simple and reproducible manner.

SUMMARY OF THE INVENTION

Accordingly, a major object of the present invention is the provision of novel platinum complexes which are conspicuously devoid of the aforesaid disadvantages and drawbacks, or which, at very least, display same to such a limited extent that the commercial attractiveness thereof is not impaired.

Briefly, the present invention features preparing a novel platinum/olefin complex hydrosilylation catalyst by reacting a platinum halide with at least one basic compound comprising the alkali metal or alkaline earth metal carbonates or bicarbonates, in the presence of an olefin ligand which is an alkenylcyclohexene having the general formula:

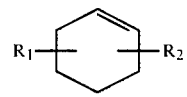  (I)

in which $R_1$ is an alkenyl radical having from 2 to 6 carbon atoms and $R_2$ is a hydrogen atom, or an organic radical which does not adversely affect the catalytic activity of platinum, in particular an alkyl radical having from 1 to 4 carbon atoms, to give a platinum/alkenylcyclohexene complex with a Cl/Pt ratio, in gram-atoms of halogen to gram-atoms of platinum, ranging from virtually 0 to 4, inclusive.

DETAILED DESCRIPTION OF THE INVENTION

More particularly according to the present invention, representative alkenyl radicals $R_1$ are the vinyl, isopropen-1-yl, n-propen-2-yl and n-buten-3-yl radicals; preferably, the radical $R_1$ is in position 4 on the cyclohexenyl ring.

Exemplary of the ligands having the formula (I), representative are 4-vinylcyclohexene, 1-vinylcyclohexene, 3-vinylcyclohexene and limonene [1-methyl-4-(1'-methyl-ethenyl) cyclohexene], with 4-vinylcyclohexene being more particularly preferred.

The ligand of formula (I) is preferably a liquid under normal conditions, but it is also possible to use low-melting solids dissolved in an organic solvent which is compatible with silicones, such as, for example, toluene, hexane and chlorobenzene.

Cyclohexene itself, unsubstituted by an alkenyl radical, cannot be used.

As examples of organic radicals which do not adversely affect the catalytic activity of platinum, representative are alkyl radicals containing from 1 to 4 carbon atoms and alkoxy radicals containing from 1 to 4 carbon atoms.

To carry out the process of the invention, it is desirable to employ a large molar excess of the ligand relative to the platinum halide; a ligand/platinum halide molar ratio of from 10 to 30 is preferably used.

The amount of chemically combined halogen in the platinum/alkenylcyclohexene complexes of the invention can be determined by any suitable known method, in particular by the disodiumbiphenyl procedure described in *Analytical Chemistry*, 22, 311 (February 1950).

The same applies to the determination of the platinum content of the complexes according to the invention. A suitable method is that employing atomic spectroscopy, as described by R. Dockyer and G. E. Haives, *The Analyst*, 84, p. 385 (1959).

To carry out the process according to the invention, chloroplatinic acid of the formula:

$$H_2PtCl_6 \cdot nH_2O$$

can be used, the same being readily commercially available in its hexahydrate form (n = 6).

Metal salts of chloroplatinic acid, such as, for example, $NaHPtCl_6 \cdot nH_2O$, $KHPtCl_6 \cdot nH_2O$, $Na_2PtCl_6 \cdot nH_2O$ and $K_2PtCl_6 \cdot nH_2O$, can also be used.

$PtCl_4 \cdot nH_2O$ and the halides of platinous type, such as $PtCl_2$, $Na_2PtCl_4 \cdot nH_2O$, $H_2PtCl_4 \cdot nH_2O$, $KHPtCl_4 \cdot nH_2O$ and $K_2PtBr_4$, can also be used.

Chloroplatinic acid in its hydrated or anhydrous form constitutes the preferred starting material according to the invention.

The process of the invention is, furthermore, preferably carried out in an organic solvent in order to dissolve the platinum halide and the complex formed. This solvent is preferably selected from among a linear or branched chain aliphatic alcohol having from 1 to 6 carbon atoms, preferably isopropanol, an aromatic organic solvent or a saturated hydrocarbon such as benzene, toluene, xylene and hexane.

As the basic compound, alkali metal carbonates and bicarbonates and alkaline earth metal carbonates and bicarbonates are used, such as sodium carbonate, sodium bicarbonate, potassium carbonate and potassium bicarbonate, preferably in an excess such that the Cl/Pt ratio falls well within the aforenoted range.

The preferred basic compounds are alkali metal bicarbonates, which enable the chemical reduction of the catalyst to its metallic form to be avoided with certainty.

The reaction temperature generally ranges from 20° to 120° C., preferably from 60 ® to 100° C., for a period typically ranging from 5 min to 2 hours.

The final Cl/Pt ratio in the product complex depends upon the choice of the starting halide, the amount of basic compound added and the reaction temperature.

The reaction time essentially depends on the temperature, this time being shorter the higher the temperature.

The complexes for which the Cl/Pt ratio ranges from virtually 0 to 2, inclusive, are preferred, since they are more soluble in the solvent used in their preparation, and they show greater reactivity in the organopolysiloxane compositions.

By a Cl/Pt ratio "virtually equal to 0", there is intended a ratio which can be equal to 0.1 or less without being zero. It has in fact been observed that it is almost impossible to have a ratio precisely equal to 0, since traces of inorganic chlorine which originate from the reaction by-products, and which are extremely difficult to remove completely, always persist in the reaction medium.

The platinum complex according to the invention can be used to catalyze organopolysiloxane compositions which entail hydrosilylation reactions in their hardening or curing. Before use, this complex is preferably diluted in an organic solvent compatible with silicones (toluene, hexanol, chlorobenzene or isopropanol, for example) or in a vinylated silicone oil.

Such compositions can be compositions which harden to elastomers at room temperature (RTV), of the type described in U.S. Pat. Nos. 3,220,972 and 3,814,730, which can be used, inter alia, for impregnation, coating, encapsulation, molding and dental impressions.

These compositions can be coating compositions, either with or without solvent, which can be used to make a material non-sticking, as described, for example, in U.S. Pat. Nos. 4,057,596, 4,071,644 and 4,162,356 and British Patent No. 1,374,732 for the solvent-free compositions, and in U.S. Pat. Nos. 3,527,659, 4,028,298 and British Patent No. 1,240,520 for the compositions with solvents.

These compositions are generally stored before use as two components or two packs, one of the components containing the catalyst and generally at least a portion of the organopolysiloxane possessing organic radicals which are alkylenically unsaturated. The other component contains, in particular, the organohydropolysiloxane, and the two components are mixed, as required, immediately before use.

The alkylenically unsaturated organopolysiloxane and the organohydropolysiloxane can be cyclic or substantially linear; advantageously, they can be a polymer or copolymer.

The present invention, hence, also relates to an organopolysiloxane composition containing:

(1) at least one organopolysiloxane which possesses, per molecule, at least two alkylenically unsaturated groups bonded to a silicon atom;

(2) at least one organohydropolysiloxane which possesses, per molecule, at least three ≡SiH groups; and (3) a catalytically effective amount of a platinum/alkenylcyclohexene according to the present invention.

The compound (1) is advantageously an organopolysiloxane comprising silyloxy units of the formula:

$$Y_a Z_b SiO_{\frac{(4-a-b)}{2}} \quad (1)$$

in which Y is an alkylenically unsaturated hydrocarbon group having from 2 to 4 carbon atoms, inclusive. Y can be, for example, a vinyl, propenyl, allyl or butenyl group, with the vinyl group being the preferred.

Z is a monovalent hydrocarbon group which does not adversely affect the activity of the catalyst. Z is generally selected from among alkyl groups having from 1 to 8 carbon atoms, inclusive, such as methyl, ethyl, propyl and 3, 3, 3-trifluoropropropyl groups, and aryl groups such as xylyl, tolyl and phenyl, a ranges from 1 to 3, b ranges from 0 to 2 and a+b ranges from 1 to 3, all other units optionally being units of the formula:

$$Z_c SiO_{\frac{4-c}{2}} \quad (2)$$

in which Z is defined as above and c has a value ranging from 0 to 3.

The compound (2) is advantageously an organohydropolysiloxane containing silyloxy units of the formula:

$$H_d W_e SiO_{\frac{4-d-e}{2}} \quad (3)$$

in which W is a monovalent hydrocarbon group which does not adversely affect the activity of the catalyst and which conforms to the same definition as Z; d has a value ranging from 1 to 3, e has a value ranging from 0 to 2, and d +e has a value ranging from 1 to 3, all other units optionally being units of the formula:

 (4)

in which W is as defined above, and g has a value ranging from 0 to 3. All the limiting values of a, b, c, d, e and g are inclusive.

The compound (1) can be formed exclusively of units of formula (1) or can contain, in addition, units of formula (2).

Compound (1) can have a linear, branched, cyclic or network structure. The degree of polymerization thereof is 2 or more, and is generally less than 5000.

Y is generally a vinyl radical and Z is generally selected from methyl, ethyl and phenyl radicals.

The compounds (1) are well known to this art and are described, for example, in U.S. Pat. Nos. 3,220,972, 3,344,111 and 3,434,366.

In the formulae (1) and (2) above, a can be an integer ranging from 1 to 3, preferably 1; b is an integer ranging from 0 to 2, the sum of a +b has a value ranging from 1 to 3 and c is an integer having a value ranging from 0 to 3.

Examples of silyloxy units of the formula (1) are the vinyldimethylsiloxane unit, the vinylphenylmethylsiloxane unit and the vinylsiloxane unit.

Examples of silyloxy units of the formula (2) are $SiO_{4/2}$, dimethylsiloxane, methylphenylsiloxane, diphenylsiloxane, methylsiloxane and phenylsiloxane units.

Examples of compounds (1) are polydimethylsiloxanes having dimethylvinylsilyloxy end groups, polymethylvinylpolydimethylsiloxane copolymers having trimethylsilyloxy end groups, polymethylvinylpolydimethylsiloxane copolymers having dimethylvinylsilyloxy end groups and cyclic polymethylvinylsiloxanes.

The compound (2) according to the invention can be exclusively composed of units of the formula (3) or contains, in addition, units of the formula (4).

The compound (2) can have a linear, branched, cyclic or crosslinked structure. The degree of polymerization thereof is 2 or more, but generally less than 5000.

Group W has the same meaning as the group Z above.

In the formulae (3) and (4) above, d is an integer ranging from 1 to 3, preferably 1; e is an integer ranging from 0 to 2, the sum of d +e ranges from 1 to 3 and g is an integer ranging from 0 to 3.

Examples of units of the formula (3) are: $H(CH_3)_2SiO_{1/2}$, $HCH_3SiO_{2/2}$, $H(C_6H_5)SiO_{2/2}$.

The examples of units of the formula (4) are the same as those given above for the units of the formula (2). Examples of compound (2) are:

polydimethylsiloxanes having hydrodimethylsilyloxy end groups, polydimethylpolyhydromethylsiloxane copolymers having trimethylsilyloxy and groups, polydimethylpolyhydromethylsiloxane copolymers having hydrodimethylsilyloxy end groups, polyhydromethylsiloxanes having trimethylsilyloxy end groups and cyclic polyhydromethylsiloxanes.

The ratio of the number of hydrogen atoms linked to the silicon in the compound (2) to the number of alkylenically unsaturated groups in the compound (1) ranges from 0.4 to 5, and preferably from 0.6 to 2. This ratio can, however, range from 2 to 5 if it is desired to make elastomer foams.

The compound (1) and/or the compound (2) can be diluted in an organic solvent which is compatible with the silicones.

The compositions can contain, in addition to the usual additives, depending upon their fields of intended use, such as reinforcing and/or non-reinforcing fillers for elastomeric compositions (pyrogenic silica, precipitated silica, ground quartz, calcium carbonate, and the like), inhibitors for elastomeric compositions and thin layer coating compositions, such as the acetylene derivatives described in U.S. Pat. Nos. 3,445,120 and 4,347,346, polydimethylsiloxane oils blocked at their polymer ends with trimethylsilyloxy groups, and the like.

The compositions of the invention can be used as such (neat) or diluted in an organic solvent.

The crosslinking of these compositions is performed at a temperature ranging from room temperature to 200° C., depending upon the type of composition and the amount of catalyst.

The curing temperature generally ranges from 60° to 140° C. The amount of catalyst by weight, calculated as weight of platinum metal, generally ranges from 2 to 600 ppm, typically from 5 to 200 ppm, based on the total weight of the composition.

The complexes according to the invention are compounds which are fairly easy to prepare, are stable on storage over very long periods at room temperature and retain their reactivity for a very long period. They are very reactive in small amounts and are especially useful in cold vulcanizable (RTV) elastomer compositions and in coating compositions, either with or without solvents, for imparting non-stick properties.

For this latter application, the compositions of the invention can hence be used either as such or diluted in a solvent. When they are dispersed or diluted in a solvent, a volatile organic solvent which is compatible with the composition is used, selected, for example, from alkanes, petroleum cuts containing paraffin compounds, toluene, heptane, xylene, isopropanol, methyl isobutyl ketone, tetrahydrofuran, chlorobenzene, chloroform and 1, 1, 1-trichloroethane. The solvent preferably constitutes from 50 to 99% by weight of the dispersion.

By evaporation of the solvent from the dispersion, the composition hardens, and these dispersions are thus useful as coating compositions for metal, wooden or glass articles and for flexible sheets of paper, plastic, and the like.

The solvent-free compositions can also be used to make a material, such as metal foils, glass, plastics or paper, non-adherent to other materials to which it would normally stick. In the case of a solvent-free composition, the composition advantageously has a viscosity not exceeding 5000 mPa.s, and preferably ranges from 10 to 4000 mPa.s at 25° C., and the ratio of the hydrogen atoms bonded to the silicon in (2) to the sum of the alkenyl radicals bonded to the silicon in (1) is at least 0.5 : 1, and generally less than 2 : 1, this ratio also being applicable to the resins with solvent. Furthermore, the compounds (1) and (2) are polymers and/or copolymers having substantially linear chains.

The solvent-free, that is to say, undiluted, compositions are applied by means of devices which are suitable for depositing small amounts of liquids in a uniform manner. For this purpose, there may be used the so-called "transfer coating" device which incorporates, in particular, two superposed rollers; the function of the lower roller, which dips into the coating bath in which the compositions are present, is to impregnate the upper roller with a very thin layer, and the function of the latter roller is then to deposit onto the paper the desired amounts of the compositions with which it is impregnated, such control of quantities being achieved by adjustment of the respective speeds of the two rollers which rotate in opposite directions. The diluted compositions, that is to say, those with a solvent, can be applied by means of devices used on industrial machines for coating paper, such as the engraved "thousand dot" roller and machines for the so-called "reverse roll" system.

Once deposited onto the supports, the compositions are hardened in a few seconds by passing same through tunnel ovens heated to 60°–200° C., the passage time through these furnaces varying generally from 2 to 30 seconds. This time depends, for a given oven length, on the speed at which the coated supports travel (this speed can exceed 200 meters per minute); in general, a support consisting of cellulosic material travels faster (for example, at a speed of 3 m/second for a temperature greater than 140° C.) than a plastic-based support. In effect, this latter material cannot withstand the effect of high temperatures, and it will therefore be subjected to a lower temperature but for a longer period, for example, it will travel at a speed of 0.75 m/second for a temperature on the order of 80° C.

The amounts of compositions deposited onto the supports can vary, and most frequently range from 0.1 to 5 g/m² of treated surface. These amounts depend upon the nature of the supports and the non-stick properties sought. Such amounts most frequently range from 0.5 to 1.5 g/m² for non-porous supports.

In order to further illustrate the present invention and the advantages thereof, the following specific examples are given, it being understood that same are intended only as illustrative and in nowise limitative. In said examples to follow, all percentages and parts are given by weight, unless otherwise indicated.

EXAMPLE 1

Preparation of a platinum/4-vinylcyclohexene complex:

A platinum/4-vinylcyclohexene complex was prepared by mixing:
(i) 1 part of $H_2PtCl_6$ 6.2;
(ii) 5 parts of isopropanol;
(iii) 2 parts of sodium bicarbonate, $NaHCO_3$; and
(iv) 6 parts of 4-vinylcyclohexene marketed by Merck.

The chloroplatinic acid was first dissolved in isopropanol, $NaHCO_3$ was then added in small portions to avoid foaming, since carbon dioxide gas was evolved, and 4-vinylcyclohexene was then added. The mixture was treated under reflux for 15 min. at approximately 80° C. under continuous stirring. The reaction mixture was cooled to ambient temperature and isopropanol was removed at 20° C. under a vacuum of 15 mbar. The inorganic impurities were precipitated in hexane and, after filtration, the solution was concentrated at 40° C. under a vacuum of 1 to 10 mbar. A very fluid, orange-colored oil was obtained in a weight yield of 85% relative to the total weight of platinum and of the initial reactants. A Cl/Pt ratio of 1.8 was obtained. The platinum concentration of the complex was adjusted to 3% by dilution with toluene. This was the solution which was employed in the subsequent steps.

EXAMPLE 2

The procedure of Example 1 was repeated, except that the treatment under reflux was for 40 min. A Cl/Pt ratio of 1.3 was obtained.

EXAMPLE 3

The procedure of Example 1 was repeated, except that 4-vinylcyclohexene was replaced by limonene. An orange-colored oil was obtained, the Cl/Pt ratio of which was 1.3.

COMPARATIVE EXAMPLE 4C

The procedure of Example 1 was repeated, except that the following starting materials were employed:
(i) 1 part of $H_2PtCl_6.6H_2O$;
(ii) 5 parts of isopropanol;
(iii) 2 parts of sodium bicarbonate; and
(iv) 6 parts of cyclohexene.

After 15 min. a black precipitate was obtained, evidencing that platinum had precipitated.

COMPARATIVE EXAMPLE 5C

Synthesis of a platinum/styrene complex:

The procedure of Example (1) of European Patent No. 57,459 was repeated exactly, except that the temperature and the reflux time were, respectively, 75°–77° C. and 30 min. The complex was obtained with difficulty, in the form of a black tar with a Cl/Pt ratio of 2.5, and was subsequently employed as a 3% solution in toluene.

EXAMPLE 5

Reactivity of the platinum/alkenylcyclohexene complexes in solvent-free compositions for the non-stick treatment of paper:

A treatment bath was prepared according to the following procedure:

A bath was formulated of 100 parts of a silicone composition containing:

(a) 90.5% of a polydimethylsiloxane copolymer containing vinyl units in the chain and a dimethylvinylsiloxyl end group, which copolymer contained approximately 3% by weight of vinyl groups and had a viscosity of approximately 250 mPa.s at 25° C.;

(b) 2.5% of 1, 3, 5, 7-tetramethyl-1, 3, 5, 7-tetravinylcyclotetrasiloxane; and (c) 7% of a polymethylhydrosiloxane fluid with a trimethylsiloxy end group, employed as a crosslinking agent, which fluid contained approximately 1.5% by weight of hydrogen atoms bonded to silicon and had a viscosity of approximately 20 mPa.s at 25° C.

To this bath were added:

(d) 60 ppm of platinum ($3 \times 10^{-4}$ g-atom of Pt/kg of composition) in the form of a platinum complex prepared in Example 1, 2 or 3.

The mixture was stirred vigorously for a few minutes at ambient temperature and was then coated, without the use of a solvent, onto paper (approximately 1 g/m²) by means of a coating bar, and the silicone composition was cured in a forced air circulation oven which was set to various temperatures.

The cure time of the silicone coating was studied in this manner by observing the minimum residence time in the oven required to produce a well-cured coating. The results obtained are reported in Table I below:

TABLE I

| Nature of the catalyst | Crosslinking time (in seconds) | | Cl/Pt |
|---|---|---|---|
| | T° of the oven 110° C. | T° of the oven 120° C. | |
| Example 1 | 18–20 | 15 | 1.8 |
| Example 2 | 15 | 10–12 | 1.3 |
| Example 3 | 15 | 10–12 | 1.3 |
| * | 30 | 25 | 4.6 |
| $H_2PtCl_6 \cdot 6H_2O$ | >120 | 100 | 5.9 |
| Example 5C | >60 | 50 | 2.5 |

Note:
*The catalyst was the reaction product of chloroplatinic acid with octanol, in accordance with U.S. Pat. No. 3,220,972.

EXAMPLE 6

45.0 g of pyrogenic silica having a specific surface area of 300 m²/g, treated with hexamethyldisilaxane, were added to 100 g of polydimethylsiloxane oil, with dimethylvinylsiloxyl end groups (0.4% by weight of vinyl groups relative to the weight of the weight of the polymer), which had a viscosity of 600 mPa.s at 25° C. To this paste was added an organosilicone composition containing:

(a) 1.7 g of a polydimethylsiloxane copolymer having hydromethylsiloxy units in the chain, which copolymer contained, based on its weight, 0.24% of hydrogen atoms bonded to silicon and had approximately 120 silicon atoms per molecule;

(b) 8 g of a polydimethylsiloxane polymer with dimethylhydrosiloxyl end groups, which had a viscosity of 30 mPa.s at 25° C.;

(c) 0.05 g of 1, 3, 5, 7-tetramethyl-1, 3, 5, 7-tetravinylcyclotetrasiloxane as a setting retarder; and (d) 8 ppm of platinum metal in the form of a 3% solution of the platinum/4-vinylcyclohexene complex prepared in Example 2.

After mixing, the composition crosslinked at ambient temperature and the increase in the viscosity of the composition was measured as a function of time, and the Shore A hardness was measured on the top and bottom of the specimens formed after 24 hours of crosslinking.

The results are reported in Table II below:

TABLE II

| Catalyst type | Bath stability | Shore A hardness (top/bottom) (**) |
|---|---|---|
| (*) | 4 hr | 22/27 |
| Example 2 | 4 hr, 30 min | 21/26 |

Note:
(*) The catalyst was the reaction product of chloroplatinic acid with octanol, in accordance with U.S. Pat. No. 3,220,972.
(**) Top = hardness measured on the specimen face surface which was exposed to the air
Bottom = hardness measured on the specimen face surface in contact with the bottom of the mold.

While this invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A composition of matter comprising an organopolysiloxane curable by hydrosilylation with an organohydropolysiloxane, and a catalytically effective amount of a hydrosilylation catalyst which comprises a platinum/olefin complex, the olefin moiety thereof which comprises an alkenylcyclohexene having the ganeral formula:

(I)

wherein $R_1$ is an alkenyl radical having from 2 to 6 carbon atoms, and $R_2$ is a hydrogen atom or an inert organic radical, and said complex having a ratio, in gram-atoms of halogen to gram-atoms of platinum, ranging from virtually 0 to 4.

2. The organopolysiloxane composition as defined by claim 1, comprising:
   (1) at least one organopolysiloxane having, per molecule, at least two alkylenically unsaturated groups bonded to a silicon atom; and
   (2) at least one organohydropolysiloxane having, per molecule, at least three ≡SiH groups.

3. The organopolysiloxane composition as defined by claim 2, comprising:
   (1) at least one organopolysiloxane containing silyloxy units of the formula:

(1)

in which Y is an alkylenically unsaturated hydrocarbon group having from 2 to 4 carbon atoms, Z is an inert monovalent hydrocarbon, a ranges from 1 to 3; b ranges from 0 to 2 and the sum a +b ranges from 1 to 3, with any remaining units comprising units of the formula:

(2)

in which Z is as defined above and c ranges from 0 to 3; and
   (2) at least one organohydropolysiloxane containing silyloxy units of the formula:

(3)

in which W is Z, d ranges from 1 to 3, c ranges from 0 to 2, and d+e ranges from 1 to 3, with any remaining units comprising units of the formula:

(4)

in which W is as defined above and g ranges from 0 to 3.

4. The organopolysiloxane composition as defined by claim 3, diluted in an organic solvent compatible therewith.

5. The organopolysiloxane composition as defined by claim 3, solvent-free, and having a viscosity no greater than 5000 mPa.s at 25° C.

6. A process for the addition of at least one organopolysiloxane having alkylenically unsaturated groups to at least one organohydropolysiloxane having ≡SiH groups comprising mixing at least one organopolysiloxane having, per molecule, at least two alkylenically unsaturated groups bonded to a silicon atom with at least one organohydropolysiloxane having, per molecule, at least three ≡SiH groups and a catalytically effect amount of a hydrosilylation catalyst which comprises a platinum/olefin complex the olefin moiety thereof which comprises an alkenylcyclohexene having the general formula:

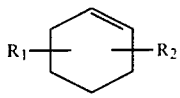 (I)

wherein $R_1$ is an alkenyl radical having from 2 to 6 carbon atoms, and $R_2$ is a hydrogen atom or an inert organic radical, and said complex having a°ratio, in gram-atoms of halogen to gram-atoms of platinum, ranging from virtually 0 to 4.

7. The process of claim 6 further comprising coating the admixture toa substrate.

8. The process of claim 6 further comprising reacting the admixture at a temperature of from about room temperature ot 200° C.

9. The process of claim 6 wherein the process forms an elastomer.

10. The process of claim 6 wherein the admixture further comprises a filler material.

11. The process of claim 8 wherein the process forms a shaped article.

* * * * *